United States Patent [19]

Uotani et al.

[11] Patent Number: 4,664,876
[45] Date of Patent: May 12, 1987

[54] FAST BREEDER REACTOR

[75] Inventors: Masaki Uotani, Komae; Tsuneyasu Yamanaka, Katsuta; Wasao Fukumoto, Hitachi, all of Japan

[73] Assignees: Central Research Institute of Electric Power; Hitachi, Ltd., both of Tokyo, Japan

[21] Appl. No.: 590,466

[22] Filed: Mar. 16, 1984

[30] Foreign Application Priority Data

Mar. 16, 1983 [JP] Japan ................................. 58-42297

[51] Int. Cl.⁴ ...................... G21G 1/06; G21C 15/00; G21C 19/28
[52] U.S. Cl. ................................... 376/290; 376/174; 376/298; 376/404
[58] Field of Search ............... 376/174, 290, 298, 402, 376/403, 404

[56] References Cited

U.S. PATENT DOCUMENTS

| 4,001,079 | 1/1977 | Rylatt | 176/87 |
| 4,249,995 | 2/1981 | Jogand | 176/65 |
| 4,351,794 | 9/1982 | Artaud et al. | 376/404 |

FOREIGN PATENT DOCUMENTS

| 1140275 | 8/1978 | Canada | 172/753 |
| 2804560 | 2/1977 | Fed. Rep. of Germany | 313/380 |
| 1069025 | 5/1967 | United Kingdom | 152/404 |
| 2090042 | 6/1982 | United Kingdom | 6/2 A |

Primary Examiner—John F. Terapane
Assistant Examiner—Eric Jorgensen
Attorney, Agent, or Firm—Antonelli, Terry & Wands

[57] ABSTRACT

A reactor core of a fast breeder reactor is supported by a core support within a reactor vessel. The reactor vessel is provided with a first or lower sodium chamber for accommodating low temperature sodium, a second or intermediate sodium chamber for accommodating low temperature sodium and a third or upper sodium chamber for accommodating high temperature sodium heated by passage of the low temperature sodium through the reactor core into the third sodium chamber. Low temperature sodium is introduced into the second sodium chamber arranged between the first and third sodium chamber for cooling the core support.

17 Claims, 7 Drawing Figures

FAST BREEDER REACTOR

BACKGROUND OF THE INVENTION

The present invention relates to a fast breeder reactor and, more specifically, to a fast breeder reactor in which one side of a core support for supporting a reactor core is held by a side wall of a reactor vessel.

A fast breeder reactor of this type has been disclosed n British Pat. No. 1 536 645 entitled "Horizontal Baffle For Nuclear Reactors" published on Dec. 20, 1978. This patent is concerned with a fast breeder reactor wherein low temperature liquid sodium in a lower portion of the reactor vessel flows in one path through the reactor core in heat transfer relationship with fuel assemblies resulting in high temperature sodium, and other low temperature liquid sodium flows around the reactor as a by-pass flow path. These paths join at an outlet portion for the liquid sodium from the reactor vessel. However, such outlet portion of the liquid sodium is subject to damage or breakage due to thermal striping at the region in which the high temperature sodium passed through the reactor core and the low temperature sodium traced around the core join. In general, mechanical strength of a core support decreases as the temperature surrounding the same increases. Thus, the core support is subject to damage due to thermal striping.

SUMMARY OF THE INVENTION

It is an object of the present invention to provide a fast breeder reactor having a contruction which avoids thermal striping at the reactor vessel.

It is another object of the present invention to provide a fast breeder reactor having a construction which enables the maintaining of the core support at a relatively cold temperature.

To this end, according to the present invention, low temperature sodium is allowed to flow onto an upper surface of the core support to cool it, whereby the core support is able to be maintained at a suitable temperature for preventing decrease in the mechanical strength and for preventing the occurrence of thermal striping at the reactor vessel.

These and other objects, features and advantages of the present invention will become more obvious form the following description when taken in connection with the accompanying drawings which show, for purposes of illustration only, a single embodiment in accordance with the present invention.

DESCRIPTION OF THE PREFERRED EMBODIMENT

Figure 1:
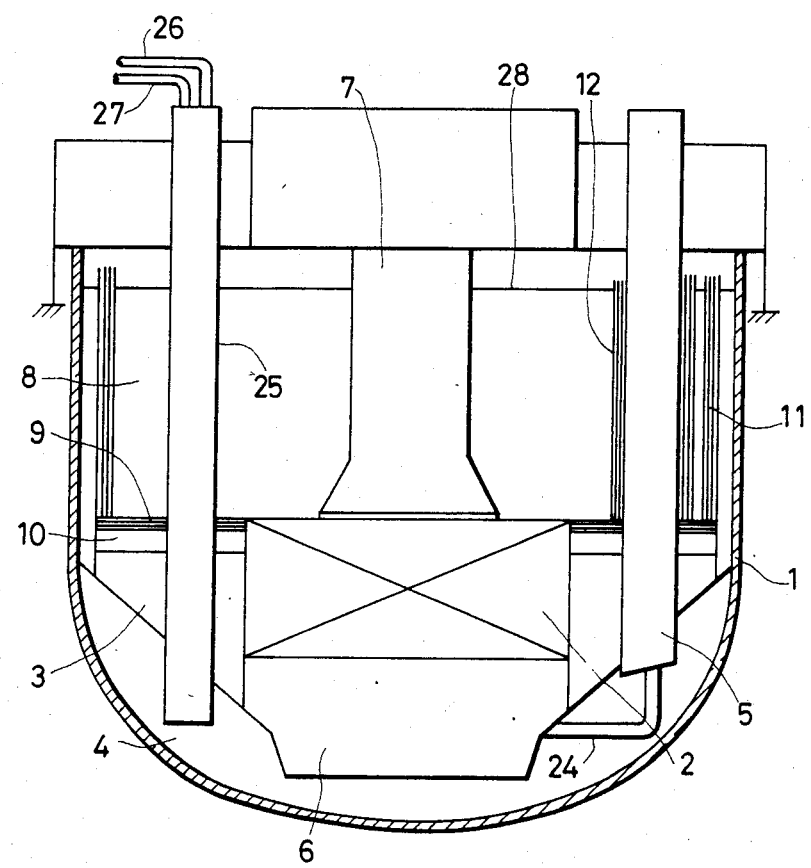
FIG. 1 is a sectional view of a fast breeder reactor according to the present invention.
Figure 2:
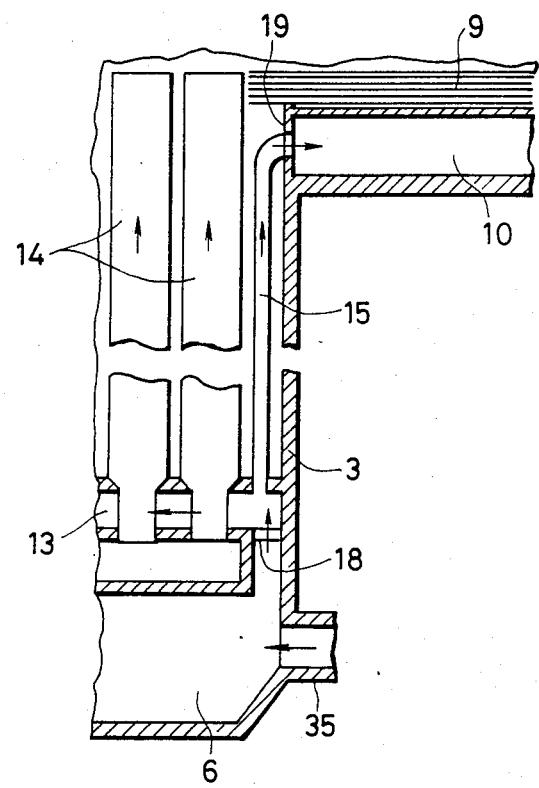
FIG. 2 is a partial sectional view of the reactor of FIG. 1 showing a system connecting the first sodium chamber and the second sodium chamber.
Figure 3:
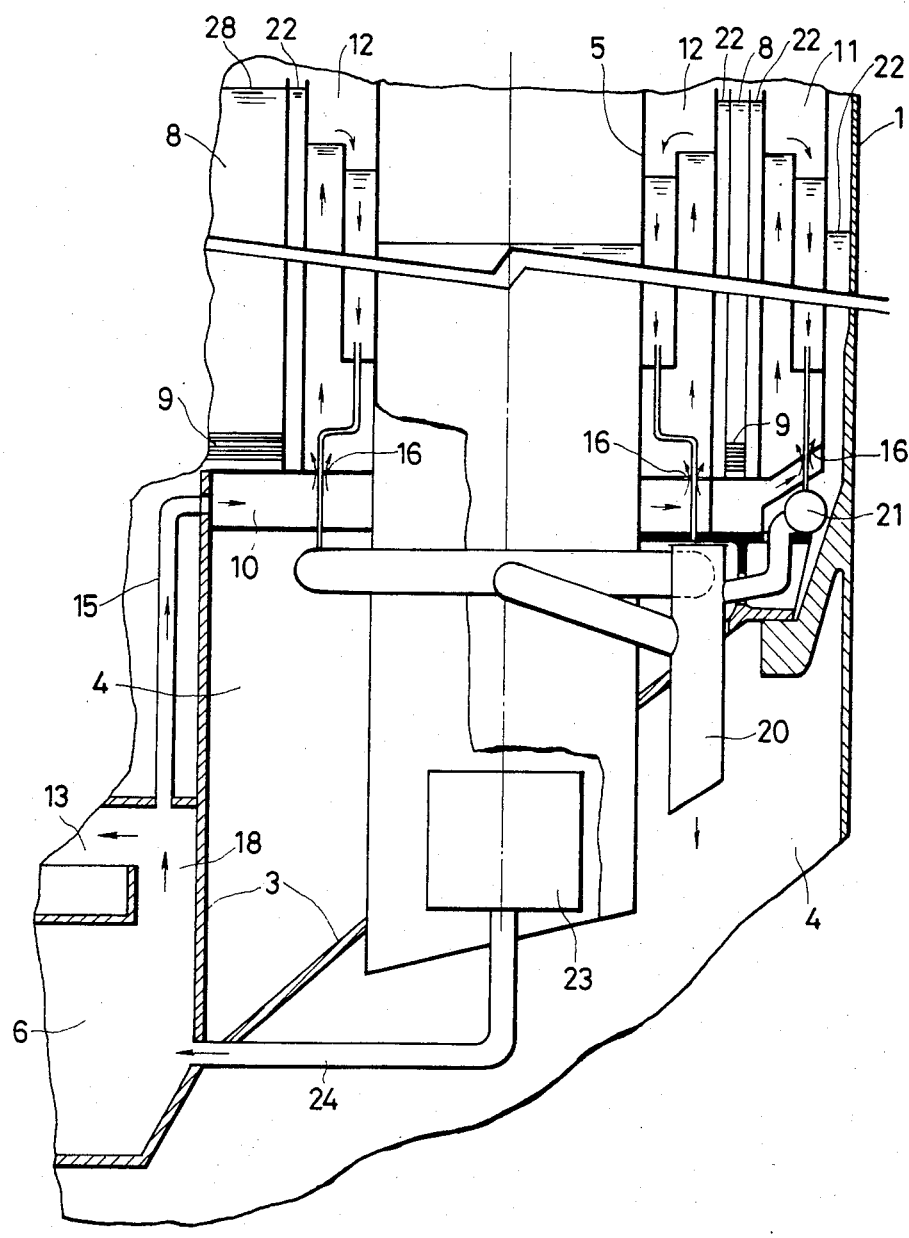
FIG. 3 is a partial sectional view of the reactor of FIG. 1 showing a system connecting the second sodium chamber and the first sodium chamber.

An embodiment of the present invention will now be described with reference to FIGS. 1 to 4 wherein FIG. 1 illustrates a fast breeder reactor having a reactor vessel 1. A reactor core 2 is supported by a core support 3 which in turn is supported by a wall of the reactor vessel 1. A first sodium chamber 4 or cold plenum is formed in the lower portion of the reactor vessel 1 and extends below the reactor core 2. Low temperature sodium in the first sodium chamber 4 is supplied into a high-pressure plenum 6 through a pipe 24 by a pump 23 (FIG. 3). The pump 23, as shown in FIG. 3, is surrounded by a cylindrical wall 5. The low temperature sodium in the high-pressure plenum 6 is introduced into an intermediate-pressure plenum 13 through a throttle 18 as shown in FIG. 2. The low temperature sodium in the intermediate-pressure plenum 13 passes through the reactor core 2 to receive heat from the reactor core 2, then passes through an upper core structure 7 located on the core 2, and reaches a sodium level 28 of an upper sodium chamber 8 containing high temperature sodium and forming a hot plenum. Laminated thermal insulation board members 9 extend in a horizontal direction and are arranged above an intermediate or second sodium chamber 10 for containing a layer of sodium. The second or intermediate sodium chamber 10 serves to thermally insulate the hot plenum or third sodium chamber 8 and the cold plenum or first sodium chamber 4.

As shown in FIG. 2, coupling pipes 15 are arranged between the core support 3 and fixed shielding members 14 that are arranged along the outermost periphery of the reactor core 2. The liquid sodium in the intermediate-pressure plenum 13 is introduced into the second sodium chamber 10 via the coupling pipes 15. The liquid sodium flowing into sodium chamber 10 cools an upper part of the core support 3. The liquid sodium in the chamber 10 is also supplied to a first wall cooling construction 11 and a second wall cooling construction 12 through orifices 16. The first wall cooling construction 11 is used for cooling the wall of the reactor vessel 1. The second wall cooling construction 12 is used for cooling the wall 5 of the pump 23. Reference numeral 22 denotes a stagnant sodium layer. The sodium which has cooled the wall of the reactor vessel 1 or the wall 5 of the pump 23 is collected into a header 21, and is drained into the first sodium chamber 4 through blow-out tubes 20. In order to uniformly flow the sodium into the reactor vessel wall cooling construction 11 and the pump wall cooling construction 12, the pressure of the sodium layer in the second sodium chamber 10 is elevated by the pump 23 and the pressure of the sodium therein is reduced through orifices 16. As shown in FIG. 3, the core support 3 is formed of members which may be considered to delimit a chamber 34 communicating with the first chamber 4 and containing low temperature sodium.

Figure 4A:
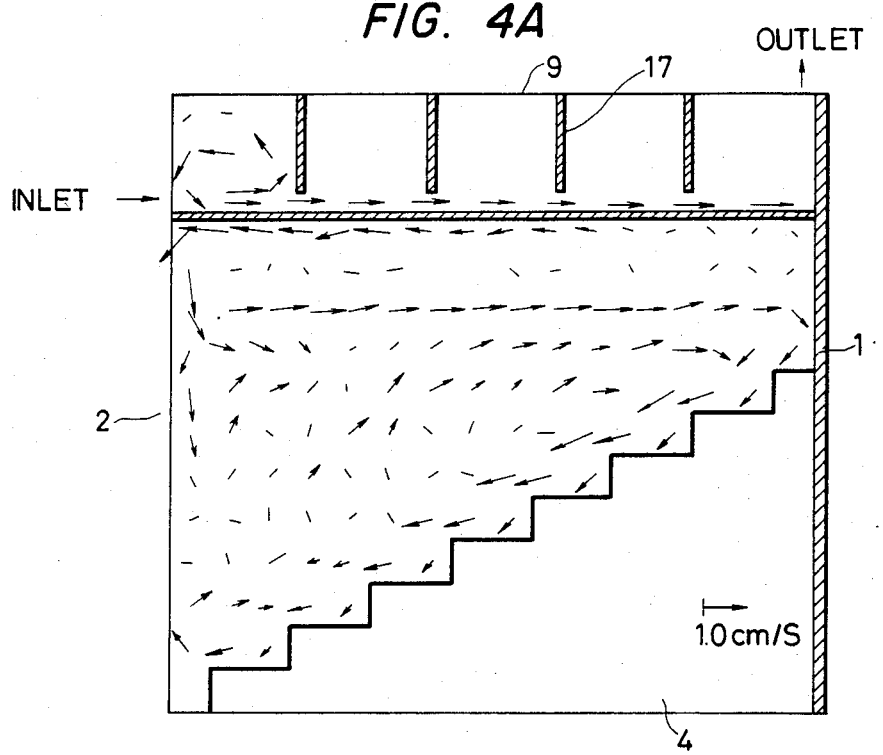
FIG. 4A is a diagram of flow velocity distribution at the sodium layers of the first and second sodium chambers of the present invention having convection-preventing members.

As shown in FIG. 4A, convection-preventing members or boards 17 are arranged to extend vertically in the second sodium chamber 10 so that the sodium therein flows under the lower ends of the convection-preventing boards 17. In operation, the liquid sodium in the hot plenum or third chamber 8 is introduced into the heat exchanger 25 (FIG. 1). The heat exchanger 25 exchanges heat between a primary system sodium which is introduced thereinto and a secondary system sodium therein. The thermal capacity obtained by the heat exchange is produced through the pipes 26 and 27 with the primary system sodium, which is reduced in temperature by the heat exchange so as to become low temperature sodium, then flowing into the first sodium chamber 4 or cold plenum.

According to experiments, it has been determined that the liquid sodium temperature in the second sodium chamber 10 is to be kept below 427° C. to prevent creep rupture of the core support 3, when the diameter of the reactor vessel 1 is 20 m and the height of the second sodium chamber 10 is 0.5 m. If, however, a stagnant layer is provided in the second sodium chamber 10 instead of a flow of the low temperature sodium introduced into the second sodium chamber 10 from the first sodium chamber 4 by using the pump 23, as illustrated in FIGS. 1-4, the liquid sodium temperature in the first sodium chamber 4 must be kept at 350° C. and the sodium temperature at the third sodium chamber 8 must be kept at 500° C. for preventing the above-mentioned creep rupture of the core support 3. In accordance with the present invention, the sodium temperature in the first sodium chamber 4 can be kept at 400° C. and the sodium temperature in the third sodium chamber 8 can be kept at 550° C., when the low temperature sodium is introduced into the second sodium chamber 10 as mentioned above. Comparing the latter or the present invention with the former arrangement discussed above, the present invention can improve its heat efficiency in the heat exchange system without suffering from any thermal striping.

Figure 4B:
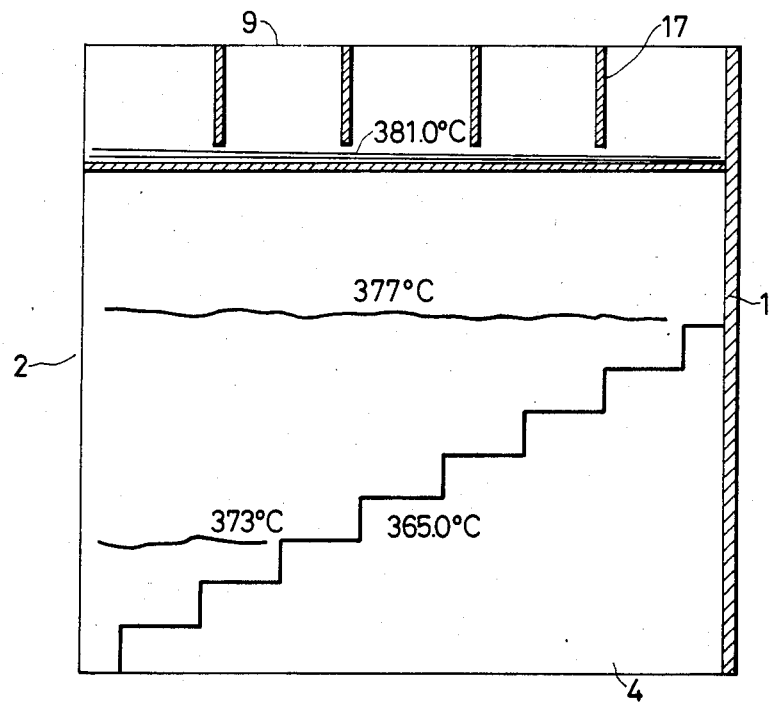
FIG. 4B is a diagram of a temperature distribution according to FIG. 4A.

As shown in FIG. 4A which is a theoretical flow velocity distribution diagram, the liquid sodium flows into the sodium chamber 10 from the center of the reactor vessel 1 at the side of the core 2, and flows out to the first wall cooling construction 11 at an outer peripheral side of the reactor vessel. It is noted that the lower member of the core support 3 is illustrated in a stepped configuration in the theoretical analysis. FIG. 4B illustrates a theoretical temperature distribution indicated by isothermal lines for the present invention. The temperature drops greatly through the sodium in the second sodium chamber 10, and the temperature is maintained at lower than 380° C. at the upper member of the core support 3.

Figure 5A:
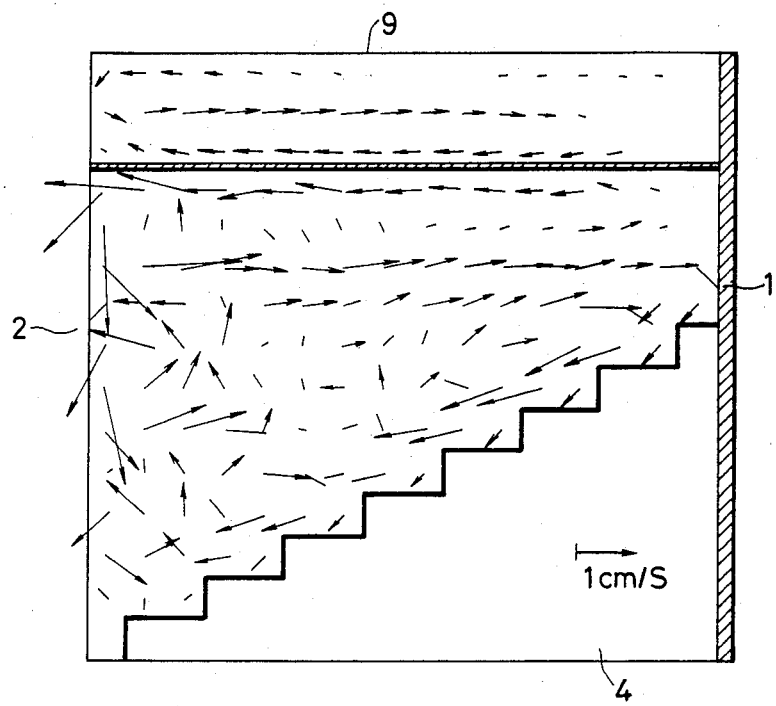
FIG. 5A is a diagram of flow velocity distribution at the sodium layers of the first and second sodium chambers without an active cooling system and convection-preventing members as shown in FIGS. 2, 3 and 4.
Figure 5B:
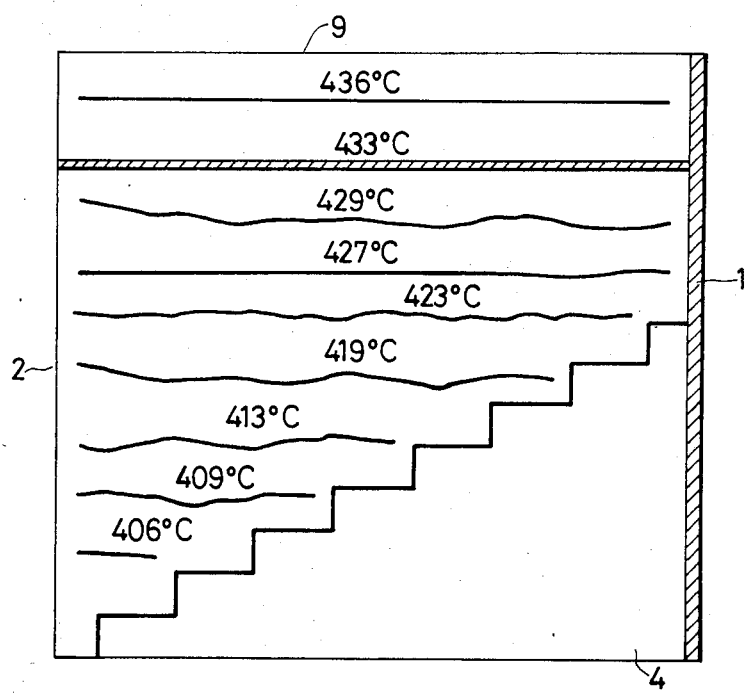
FIG. 5B is a diagram of a temperature distribution according to FIG. 5A.

FIG. 5A represents a theoretical flow velocity diagram of liquid sodium in which the first wall cooling construction 11, the second wall cooling construction 12, the coupling pipes 15, the orifices 16, the convection-preventing members 17, the blow-out tubes 20, the header 21, and the stagnant sodium layer 22 as shown in FIGS. 2, 3 and 4 are omitted. FIG. 5B represents a theoretical temperature distribution for the configuration of FIG. 5A.

As apparent from a comparison of FIGS. 4B and 5B, the present invention can reduce the temperature at the upper member of the core support 3 by about 50° C. compared with the structure shown in FIGS. 5A and 5B, while also providing a reduction in temperature in the region of the lower member of the core support. Further, there is a small temperature difference between the upper and lower members of the core support 3.

In accordance with the present invention, the sodium is uniformly introduced into the first wall cooling construction 11 or the second wall cooling construction 12, in order to provide for a substantially uniform temperature in the circumferential direction of the reactor vessel 1 or the pump wall 5. This can be accomplished by elevating the pressure in the sodium chamber 10 via the pump 23, and reducing the pressure of the sodium through the orifice or throttle 18.

As described above, the present invention provides a fast breeder reactor configuration which enables a reduction in the temperature difference between the upper and lower members of the core support 3 so that the occurrence of thermal striping of the reactor vessel 1 is avoided. The sodium can be uniformly supplied into the reactor vessel wall and pump wall to effect cooling. Thus, a fast breeder reactor of simplified construction, light weight, compact in size, and more reliable can be provided.

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:

1. A fast breeder reactor comprising:
   a reactor vessel;
   a reactor core disposed within the reactor vessel;
   core support means for supporting the reactor core, the core support means being supported by a wall of the reactor vessel;
   a first sodium chamber formed at a lower portion of the reactor vessel and extending below the reactor core for accommodating low temperature sodium therein;
   a second sodium chamber provided along an upper member of the core support means, and adjacent to a portion of the wall of the reactor core;
   a third sodium chamber provided on the reactor core and at least on a portion of the second sodium chamber for accommodating high temperature sodium which is heated to a high temperature by the reactor core during passage of low temperature sodium from the first sodium chamber through the reactor core and into the third sodium chamber, the second chamber being located between the first sodium chamber and the third sodium chamber; and
   first means for introducing the low temperature sodium in the first sodium chamber into the second sodium chamber for cooling the core support means;
   the second sodium chamber including means for preventing convection in the second sodium chamber, the convection-preventing means including at least one member extending in the second sodium chamber in a direction from the third sodium chamber toward the first sodium chamber with a lower end surface thereof spaced from a lower surface of the second sodium chamber so that the low temperature sodium flows under the lower end surface of the convection-preventing member.

2. A fast breeder reactor according to claim 1, further comprising second means for introducing the low temperature sodium in the second sodium chamber into the first sodium chamber.

3. A fast breeder reactor according to claim 2, wherein the second introducing means includes a first wall cooling means extending along the inner periphery of the reactor vessel, the first wall cooling means communicating with the second sodium chamber for receiving the low temperature sodium therefrom and for delivering the low temperature sodium to the first sodium chamber.

4. A fast breeder reactor according to claim 2, wherein the first introducing means includes pressure means for maintaining the low temperature sodium in the second sodium chamber under an elevated pressure.

5. A fast breeder reactor according to claim 4, further comprising a wall surrounding the pressure means, the second introducing means including a second wall cooling means extending along the wall of the pressure means, the second wall cooling means communicating with the second sodium chamber for receiving the low temperature sodium therefrom and for delivering the low temperature sodium to the first sodium chamber.

6. A fast breeder reactor according to claim 1, wherein said convection-preventing means includes a plurality of convection-preventing members provided in the second sodium chamber.

7. A fast breeder reactor according to claim 1, further comprising heat exchange means responsive to the high temperature sodium in the third sodium chamber for producing a thermal capacity therefrom.

8. A fast breeder reactor according to claim 7, wherein the heat exchange means includes means for delivering low temperature sodium to the first sodium chamber.

9. A fast breeder reactor according to claim 1, wherein the reactor core is disposed centrally within the reactor vessel and the core support means extends outwardly from the reactor core toward the wall of the reactor vessel, the core support means including the upper member and a lower member which at least partially delimit a sodium chamber for accommodating low temperature sodium, the upper member forming a lower surface of the second sodium chamber, and a member extending from the reactor core toward the wall of the reactor vessel for forming an upper surface of the second sodium chamber.

10. A fast breeder reactor according to claim 9, further comprising second means for introducing the low temperature sodium in the second sodium chamber into the first sodium chamber.

11. A fast breeder reactor according to claim 10, wherein the second introducing means includes a first wall cooling means extending from the second sodium chamber along the inner periphery of the reactor vessel, the first wall cooling means communicating with the second sodium chamber for receiving the low temperature sodium therefrom and for delivering the low temperature sodium to the first sodium chamber.

12. A fast breeder reactor according to claim 11, wherein the first introducing means includes pressure means for maintaining the low temperature sodium in the second sodium chamber under an elevated pressure.

13. A fast breeder reactor according to claim 12, further comprising a substantially cylindrical wall surrounding the pressure means, the second introducing means including a second wall cooling means extending from the second sodium chamber along the wall of the pressure means, the second wall cooling means communicating with the second sodium chamber for receiving the low temperature sodium therefrom and for delivering the low temperature sodium to the first sodium chamber.

14. A fast breeder reactor according to claim 1, wherein said convection-preventing means includes a plurality of convection-preventing members provided in the second sodium chamber and spaced from one another in the direction extending from the reactor core toward the wall of the reactor vessel.

15. A fast breeder reactor according to claim 14, further comprising heat exchange means responsive to the high temperature sodium in the third sodium chamber for producing a thermal capacity therefrom.

16. A fast breeder reactor according to claim 15, wherein the heat exchange means includes means for delivering low temperature sodium to the first sodium chamber.

17. A fast breeder reactor according to claim 13, wherein said convection-preventing means includes a plurality of convection-preventing members provided in the second sodium chamber and spaced from one another in the direction extending from the reactor core toward the wall of the reactor vessel.

* * * * *